United States Patent [19]
Jarvis

[11] Patent Number: 5,918,040
[45] Date of Patent: *Jun. 29, 1999

[54] METHOD FOR MAINTAINING TIME SYNCHRONIZATION BETWEEN TWO PROCESSORS IN A NETWORK INTERFACE

[75] Inventor: Neil Alasdair James Jarvis, Reading, United Kingdom

[73] Assignee: Cabletron Systems, Inc., Rochester, N.H.

[*] Notice: This patent issued on a continued prosecution application filed under 37 CFR 1.53(d), and is subject to the twenty year patent term provisions of 35 U.S.C. 154(a)(2).

[21] Appl. No.: 08/615,813

[22] Filed: Jul. 25, 1995

Related U.S. Application Data

[63] Continuation of application No. 08/130,078, Sep. 30, 1993, abandoned.

[30] Foreign Application Priority Data

Oct. 1, 1992 [GB] United Kingdom .................... 9220729

[51] Int. Cl.$^6$ ....................................................... G06F 1/12
[52] U.S. Cl. ........................... 395/553; 375/358; 370/507
[58] Field of Search ..................................... 375/356, 358, 375/359; 370/503, 507, 508, 516, 519; 368/47, 46, 55; 395/553, 551, 558

[56] References Cited

U.S. PATENT DOCUMENTS

| | | | |
|---|---|---|---|
| 3,798,650 | 3/1974 | McComas et al. ...................... | 343/225 |
| 4,142,069 | 2/1979 | Stover ................................. | 179/15 BS |
| 4,337,463 | 6/1982 | Vangen ..................................... | 368/47 |
| 4,494,211 | 1/1985 | Schwartz .................................. | 375/107 |
| 4,530,091 | 7/1985 | Crockett ..................................... | 370/60 |
| 4,592,050 | 5/1986 | Bensadon ................................. | 370/103 |
| 4,607,257 | 8/1986 | Noguchi ..................................... | 368/46 |
| 4,653,049 | 3/1987 | Shinmyo ................................. | 370/103 |
| 4,746,920 | 5/1988 | Nellen et al. ............................ | 340/825 |
| 4,757,521 | 7/1988 | Korsky et al. ........................... | 375/109 |
| 4,807,259 | 2/1989 | Yamanaka et al. ...................... | 375/109 |
| 4,815,110 | 3/1989 | Benson et al. ........................... | 375/107 |
| 4,894,846 | 1/1990 | Fine ......................................... | 375/107 |
| 4,939,753 | 7/1990 | Olson ....................................... | 375/107 |
| 5,001,730 | 3/1991 | Franaszek et al. ....................... | 375/107 |
| 5,131,084 | 7/1992 | Kasashima et al. ..................... | 395/553 |
| 5,222,229 | 6/1993 | Fukuda et al. ........................... | 395/553 |
| 5,404,575 | 4/1995 | Lehto ...................................... | 375/356 |
| 5,428,645 | 6/1995 | Dolev et al. ............................. | 375/356 |

FOREIGN PATENT DOCUMENTS

| | | | |
|---|---|---|---|
| 404235382 | 8/1992 | Japan ...................................... | 368/55 |
| 135764 | 4/1985 | United Kingdom ............ | G06F 15/16 |
| 2164766 | 3/1986 | United Kingdom ..................... | 368/46 |

*Primary Examiner*—Jason Chan
*Assistant Examiner*—Jean B Corrielus
*Attorney, Agent, or Firm*—Wolf, Greenfield & Sacks, P.C.

[57] ABSTRACT

A method for performing timer synchronization between a first processor having a first timer and a second processor having a second timer is presented. The first processor issues to the second processor a first timer value corresponding to the current value of the first timer and the second timer compares the first timer value with a second timer value corresponding to the current value of the second timer. If the second timer value is less than the first timer value, the second processor increments the second timer value to a new second timer value equal to the first timer value. If the second timer value is greater than the first timer value, the second processor issues to the first processors the second timer value and the first processor adjusts the first timer value to be equal to the second timer value.

2 Claims, 4 Drawing Sheets

METHOD FOR MAINTAINING TIME SYNCHRONIZATION BETWEEN TWO PROCESSORS IN A NETWORK INTERFACE

This application is a continuation of application Ser. No. 08/130,078, filed Sep. 30, 1993, now abandoned.

FIELD OF THE INVENTION

The present invention relates to timer synchronization systems, and in particular to the synchronization of a current time value between two processors in a computer system.

It is a common requirement for two or more processors in communication with each other to be provided with a clock with which to provide time-stamping information to certain processes, and in certain applications, it is necessary that these clocks are synchronized throughout the system. An example of such time-stamping requirements is found in data communication networks where data packets transferred over the networks may have expiry times placed upon them, to ensure that old data packets containing stale data may be eliminated.

It is also commonly a requirement in synchronizing individual clocks to one another that no clock in the system be permitted to decrease its present time which avoids any possibility that time-stamps generated at a later real time may precede earlier ones.

SUMMARY OF THE INVENTION

It is therefore an object of the present invention to provide a timer synchronization scheme which allows individual processors to synchronize clocks while ensuring that any clock may only be adjusted in one direction, ie. only forward in time, or backward in time.

According to one embodiment of the present invention there is provided a method for the synchronization of a first and a second timer including the following steps:

a) said first timer (M) issuing to said second timer (S) the current value of said first timer ($M_0$);

b) said second timer (S) comparing said first timer value ($M_0$) with the current value of said second timer ($S_0$);

c) if said second timer value ($S_0$) is less than said first timer value ($M_0$), said second timer (S) incrementing said current second timer value ($S_0$) to a new second timer value ($S_1$) equal said first timer value ($M_0$); and d) if said second timer value ($S_0$) is greater than said first timer value ($M_0$), said second timer (S) issuing to said first timer (M) the current value of said second timer ($S_0$).

BRIEF DESCRIPTION OF THE DRAWINGS

Embodiments of the present invention will now be described by way of example and with reference to the accompanying drawings in which.

DESCRIPTION OF THE PREFERRED EMBODIMENTS

Figure 1:
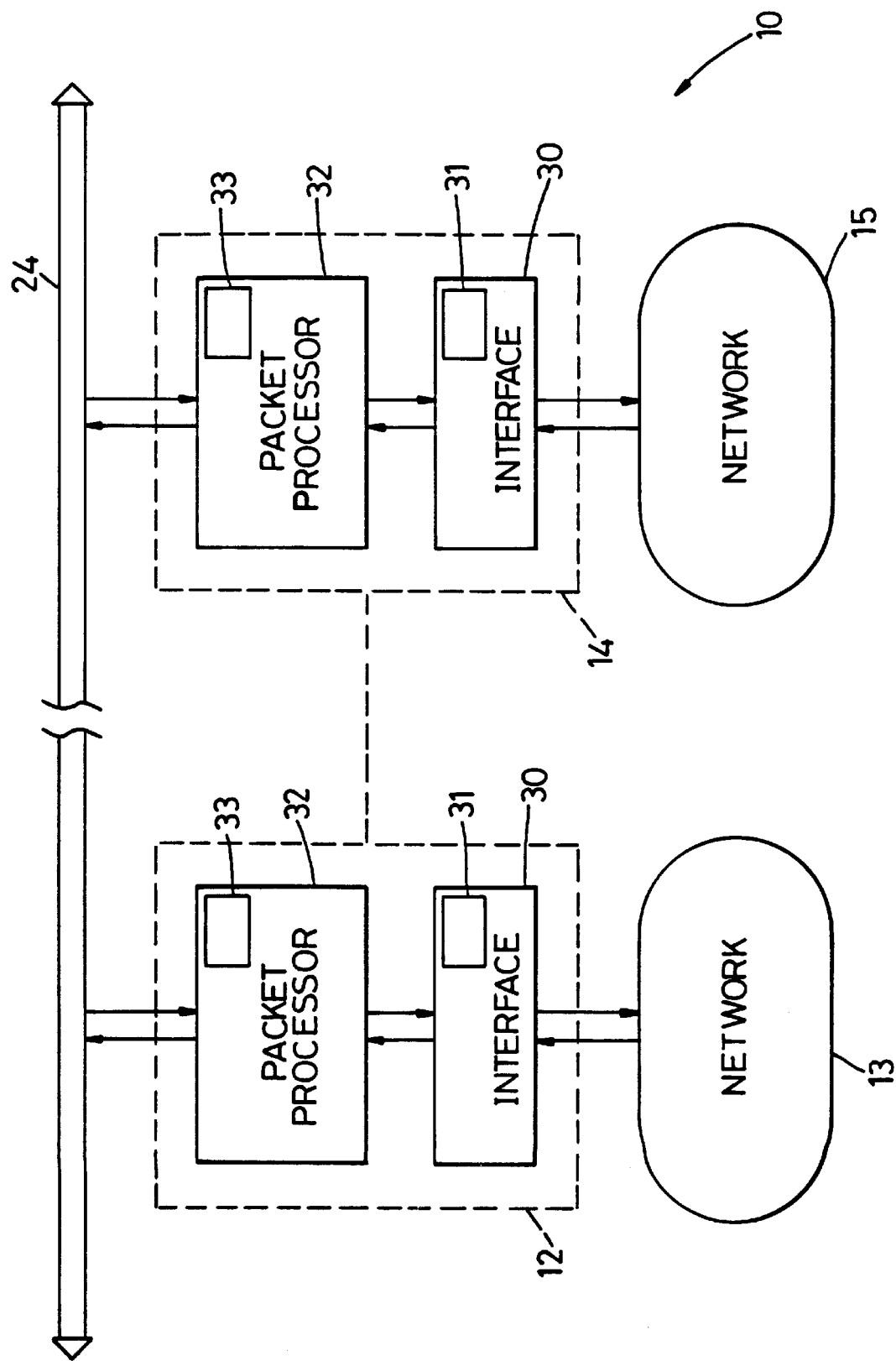
FIG. 1 shows a schematic diagram of a routing system suitable for using the present invention, and useful in the description thereof.

With reference to FIG. 1 there is shown a routing system 10 for the routing or bridging of data packets on a data communication network. Such a system is described for the purposes of illustrating a typical use of the timer synchronization scheme.

The routing system 10 includes a number of linecards (only two illustrated) 12,14 each of which is connected to a corresponding network 13,15 of various types. The linecards 12,14 are each responsible for interfacing with the particular type of network to which they are attached. For example, linecard 12 may interface with an FDDI optical fibre network 13, and linecard 14 might interface with an Ethernet type network 15. The linecards 12,14 are mutually connected over a high speed bus 24.

Each line card 12,14 includes an interface unit 30 and a packet processing unit 32. The interface unit 30 is operative to receive data packets from its respective network 13,15 and to place data packets onto its respective network 13,15. Data packets received by interface unit 30 from the network 13 are passed to the packet processing unit 32 for routing of the packets to various addresses throughout the system over the bus 24. Data packets received from other parts of the routing system 10 are received by packet processing unit 32 from the bus 24, and passed to interface 30 for onward transfer onto the network 13. Data packets are typically buffered at various points throughout the system, and may be held in memory pending the outcome of other processing operations, and thus data packets may exist within the system for some time.

In each of the linecards, the interface unit 30 and packet processing unit 32 each operate within their own separate time domain, and there is no communication therebetween, other than by the transfer of data packets. Each unit 30,32 includes an absolute time clock or timer 31,33 so that timing information may be included within packets of data therebetween. In the particular protocol used, data packets received over the network must not be allowed to exist in the system after a certain time period to ensure that stale data is not transmitted around the system. To facilitate this, data packets received by the interface unit 30 are "time-stamped" with an expiry time, which is generated from the absolute time clock therein. These packets are passed to the packet processor where they will be buffered until the packet processor is capable of handling them. Likewise, packets processed for sending over the networks 13,15 by processor 32 are stamped with an expiry time by the packet processor to ensure that the interface unit 30 does not transmit old data packets. Time-stamp information is checked at entry and exit of the processor unit 32 and interface unit 30. Any packet received after its expiry time is deemed to contain stale data and is therefore to be discarded.

For the time-stamping mechanism to operate correctly, the absolute time clocks of the receiver and the transmitter of the data packet must be synchronized to the same time value. Time value quantization units are chosen to be substantially larger than a transmission time of a data packet between the timing domains, but sufficiently small to provide the required resolution in the ageing out process. In the present illustrative embodiment, the time values of each individual clock are incremented in time quantization units of 10 milliseconds, a typical data packet transmission time is 100 microseconds and expiry times of data packets are typically of the order of 500 milliseconds.

The protocol required for keeping the time value synchronized between the two processors must also cope with the restriction that time values in any particular processor may only be increased, and not decreased. This ensures that packets exceeding the age of 500 milliseconds will always be discarded, at the expense of ageing out of some packets slightly prematurely. Of course, this protocol could be reversed, and it will become evident from the following description, that the present invention may be applied to both protocols.

The protocol must also take into account that the synchronization operation must take place using the data packet communication channel, the characteristics of which are that delivery time of any packets containing synchronization transactions to the destination processors cannot be guaranteed. That is to say, where a data packet is passed from a first processor to a second processor which are, in fact synchronized, the packet may arrive at the second processor at a time later than the departure time of the packet from the first processor. Such a delay may arise from two separate causes: firstly the "time of flight" of the packet (transmission time on the communication channel), and secondly, the buffering delay before processing the packet. In the present illustrative embodiment, this non-eterministic nature of the packet transfer time is substantially due to the uncertainty introduced by the buffering of data packets in both the packet processing unit 32 and the interface unit 30 when transferring data packets therebetween. In practice, the interface unit 30 receives a packet from the network 13, time stamps the packet, and passes it on to the packet processing unit 32, where it may reside in a buffer until it can be processed. The reverse situation also holds: a packet being routed onto the network 13 is processed and time stamped by packet processing unit 32 and passed to interface 30 where it will reside in a buffer until it can be processed by the interface unit for transmission onto the network 13. Because the synchronizing transactions are transferred in similar fashion, the synchronization scheme must take into account this non-eterministic transfer time. Of course, it will be recognized that the same criteria apply to transactions between processors where the "time of flight" of the packet between the processors may form a substantial part of the delay.

In the synchronization scheme according to the present invention, the processor, or timer which initiates the synchronization operation is hereinafter referred to as the master M and the processor responding to the synchronization operation is referred to as the slave S. The identification of which processor is to be master or slave is arbitrary to the present invention, and may be determined by many other factors.

Figure 2:
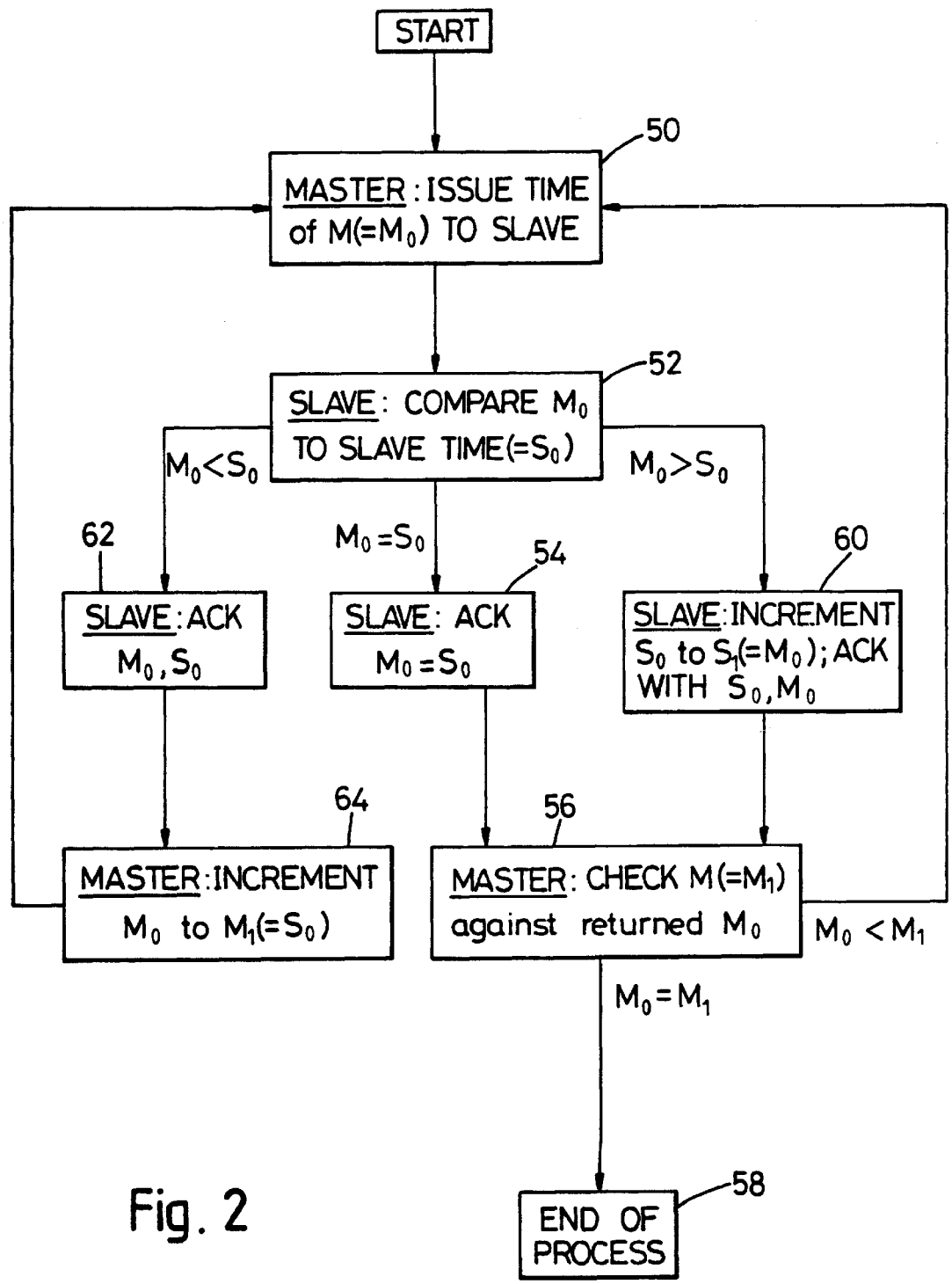
FIG. 2 shows a flow diagram representing an embodiment of the present invention.

With reference to FIG. 2, the synchronization operation is initiated by the master according to some predetermined criteria. For example, the synchronization may take place at routine intervals. At the outset of the synchronization operation, the master M issues to the slave S, a data packet containing a synchronization request and its current time value $M_0$ (step 50). The master M then awaits a response from slave S.

The slave S receives the synchronization request and compares the issued master time value $M_0$ with its own current slave time value $S_0$ (step 52). Three possible outcomes may arise from this comparison.

Firstly, if the times are the same ($M_0=S_0$), then no synchronization is necessary, and acknowledgement of this by the slave S to the master M is effected by sending a data packet containing a confirm response and the values $M_0$, $S_0$ (step 54). Of course, in the intervening period between sending out the synchronization request, and receiving the acknowledgement from the slave S, it is possible that the master M has incremented its clock. Thus master M checks its new present value $M_1$ against the issued and returned value $M_0$ (step 56). If $M_0=M_1$ then the master clock has not incremented in the intervening period and the synchronization operation has successfully completed (step 58) with one transaction. If $M_0<M_1$ then the clock has incremented in the intervening period and the synchronization transaction is completed, but the synchronization operation has failed. A further transaction must be re-initiated (return to step 50).

Secondly, in the event that the slave S is behind the master M in time ($M_0>S_0$), then the slave S increments its timer value to a new value $S_1$ equal to the issued master time value $M_0$. It acknowledges this action by sending a data packet to the master M containing a confirm response including the received master time value $M_0$, and the old slave timer value $S_0$ before synchronization (step 60). Master M then recognizes that slave S has synchronized to the issued master time value $M_0$ (and can identify by how much if necessary), and checks to see that this time value $M_0$ is still equal to the present master time value $M_1$ (step 56). If $M_0=M_1$, then the synchronization transaction has successfully completed the synchronization operation (step 58). If during the transaction, master M has incremented its timer such that $M_1>M_0$. then the synchronization transaction has completed but has failed to complete the synchronization operation, and a new transaction must be initiated (return to step 50).

Thirdly, in the event that the slave S is ahead of the master M in time ($M_0<S_0$), then the slave is unable to turn back the slave timer due to the protocol constraint already identified. Slave S therefore acknowledges the synchronization request by issuing to the master M a data packet containing a confirm response and issued master time $M_0$ together with the current time value $S_0$ of the slave timer S (step 62). The master M receives the time value $S_0$ and increments its timer value $M_1$ to equal $S_0$ (step 64). Because the slave S may, in the intervening period, have incremented its time value to a new value $S_1$, the master automatically initiates a new synchronization transaction (return to step 50).

Figure 3:
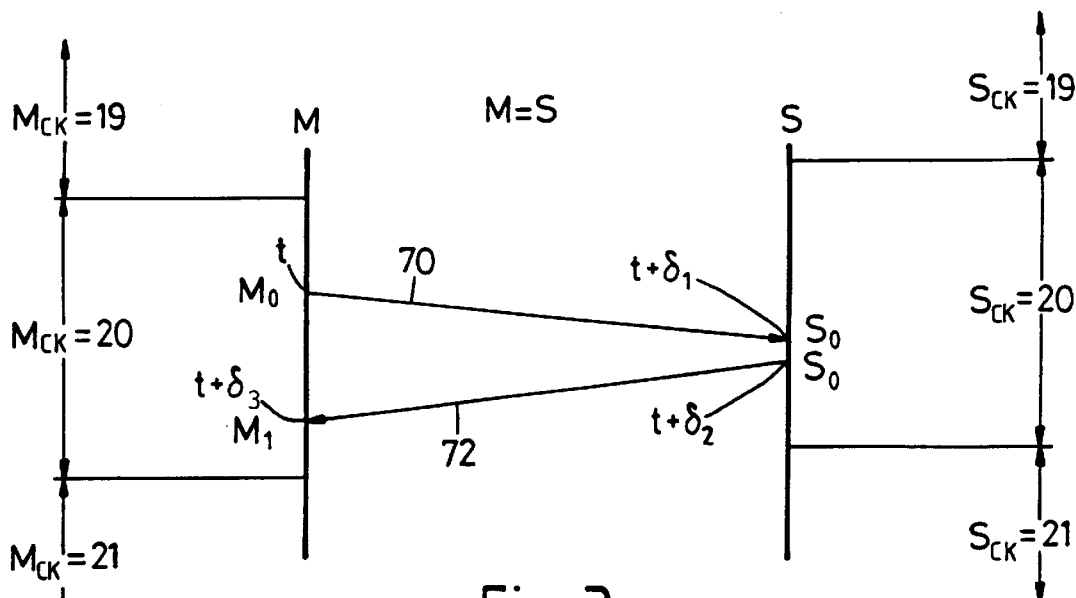
FIG. 3 shows a timing diagram representing a one-transaction timing synchronization operation according to the invention.

The synchronization operation is alternatively represented in FIGS. 3,4 and 5 as timing diagrams. On the left hand side is shown the time $M_{CK}$, in arbitrary units, of the master M. The clock interval, or "tick", is represented by horizontal lines at each point where the clock self-increments. Where the master clock has a "set" time imposed upon it by the slave response, this is represented by a double horizontal line. On the right hand side is shown the time $S_{CK}$, in the same arbitrary units, of the slave S. The clock interval is represented by horizontal lines at each point where the clock self-increments. Where the slave clock has a "set" time imposed upon it by the master M, this is represented by a double horizontal line. Each transaction of two data packets is represented by a continuous line between master and slave (the "request" packet), and a second continuous line returning from slave to master (the "response" packet). The angle of the lines is merely diagrammatic to represent the real packet transfer time (eg. $\delta_1$; FIG. 3) between the sending of the associated data packet, and the processing of that packet by the receiving processor. This time delay $\delta_1$ is, as explained above, a variable, and is composed of a small "flight time" element, and a very much larger buffer time element.

FIG. 3 represents a first case where time $M_0=S_0$ and only one transaction is required to successfully complete the synchronization operation. The master M issues a synchronization request data packet 70 at a real time t. The packet 70 arrives for processing at slave S at a real time $t+\delta_1$, $\delta_1$ representing the packet transfer time. The slave processes the packet 70, and issues a response packet 72 at time $t+\delta_2$, the difference $\delta_2-\delta_1$ representing the processing time. The packet 72 arrives for processing by the master M at time $t+\delta_3$, the difference $\delta_3-\delta_2$ representing the packet transfer time. The packet 70 is issued by the master indicating its clock time $M_0=20$. The slave receives the packet 70, compares the master time $M_0=20$ with its own time $S_0=20$ and thus confirms time set in response packet 72. Master M receives this response at time $M_1=20$ which confirms that the synchronization operation has completed with a single transaction.

Figure 4A:
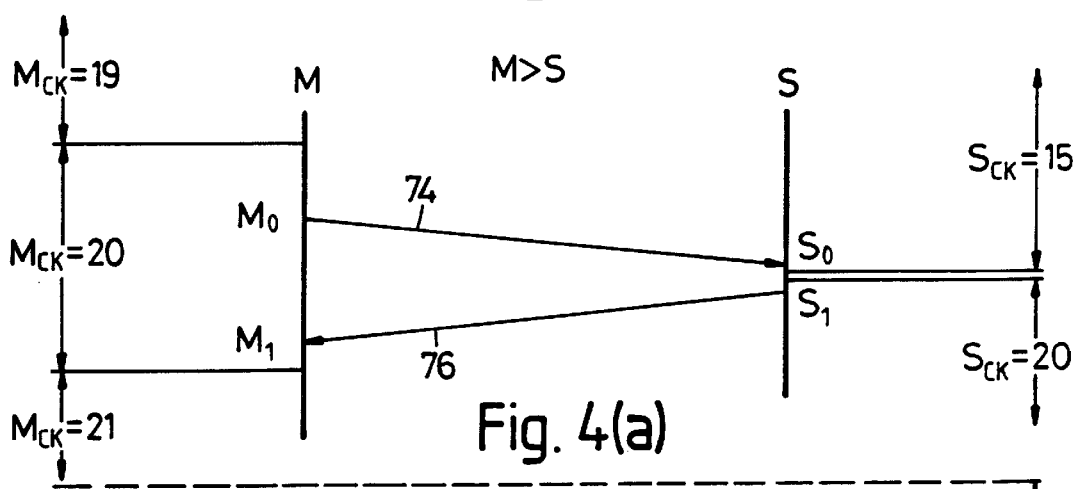
FIGS. 4(a) and 4(b) show two timing diagrams representing respectively a one- and a two-transaction timing synchronization operation according to the present invention.
Figure 4B:
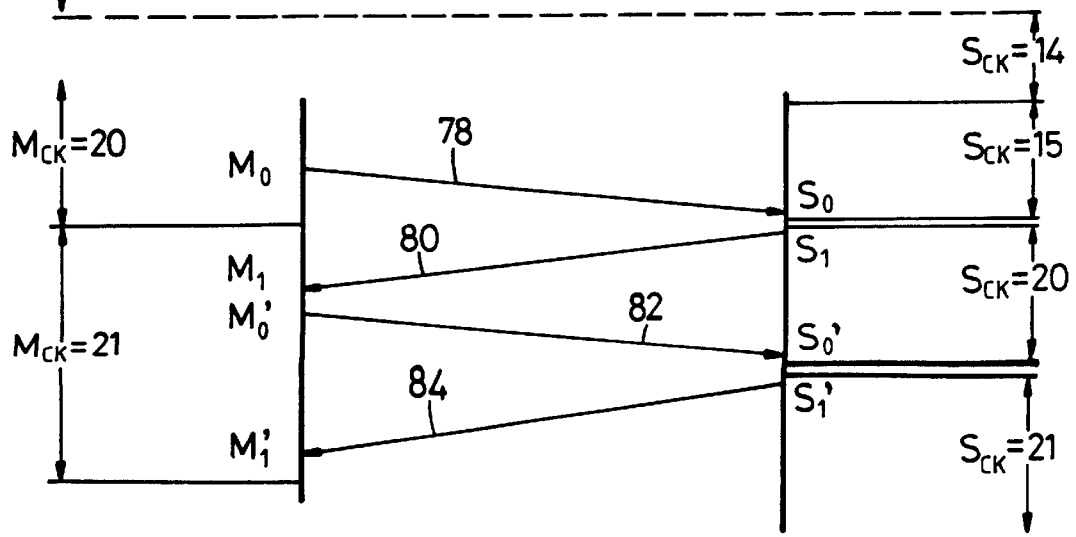

FIG. 4 represents a second case where $M_0>S_0$, and shows in FIG. 4(a) the situation where a single transaction is required to complete the synchronization operation, and in FIG. 4(b) the situation where two transactions are required to successfully complete synchronization, ie. the master increments before receiving the slave response.

In FIG. 4(a), master M issues request data packet 74 at time $M_0=20$. This is received by slave S at $S_0=15$. Slave S therefore sets clock $S_{CK}$ so that $S_1=20$ and issues response packet 76 to master M with this set time. Master M receives this packet at time $M_1=20$ which confirms that the synchronization operation has completed with a single transaction.

In FIG. 4(b), the operation commences in like manner with issue of request packet 78 by master M at $M_0=20$. However, by the time the response packet 80 from S has been received, the clock $M_{CK}$ has self-incremented, and $M_1=21$. A second transaction is then necessary and is implemented with issuance of packet 82 at $M_0'=21$, receipt at $S_0'$ and return of response packet 84 in the manner of FIG. 4(a). The synchronization operation is then completed.

Figure 5A:
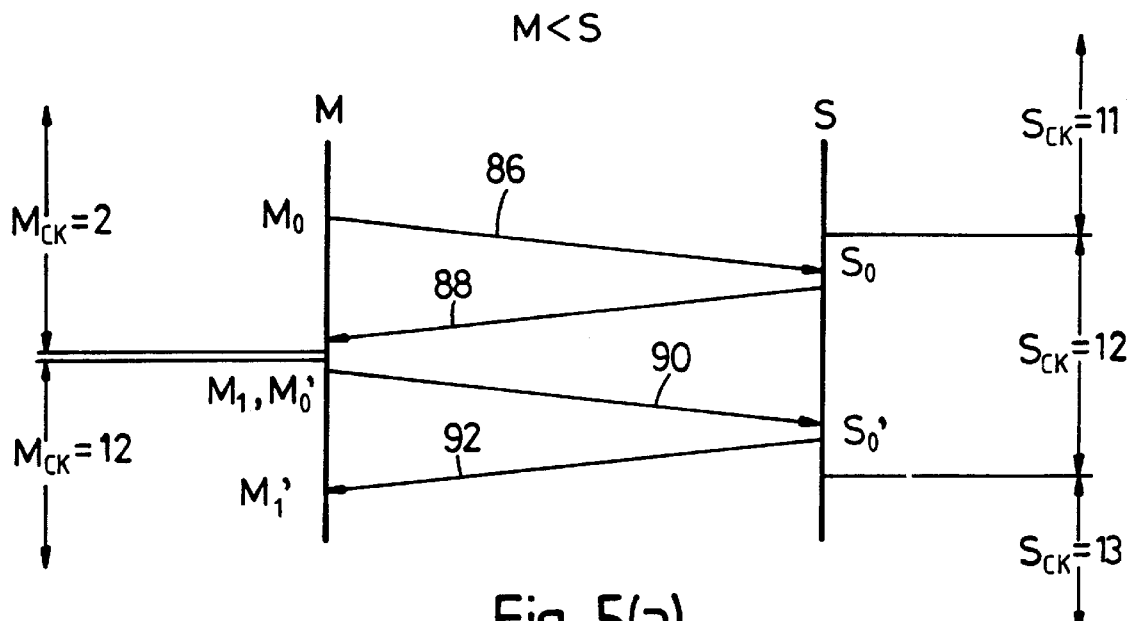
FIGS. 5(a) and 5(b) show two timing diagrams representing respectively a two- and a three-transaction timing synchronization operation according to the present invention.
Figure 5B:
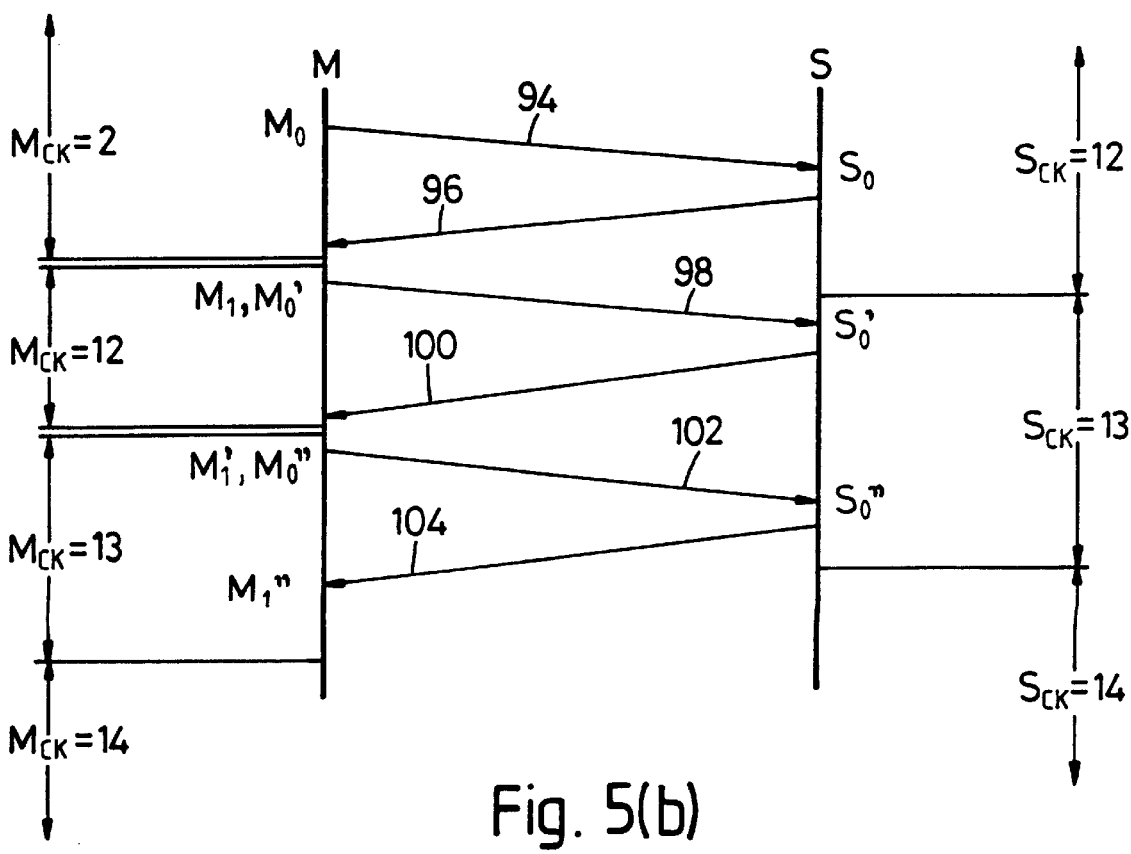

FIG. 5 represents the third possible case where $M_0<S_0$, showing in FIG. 5(a) a situation where two transactions are required to complete synchronization, and in FIG. 5(b) a situation where three transactions are required to successfully complete synchronization, ie. the slave self-increments during synchronization of the master to the slave time value. The second transaction 98,100 is indicated with $M_0'$, $S_0'$, $M_1'$ and $S_1'$ and the third transaction 102,104 is indicated with $M_0''$, $S_0''$, $M_1''$ and $S_1''$.

In FIG. 5(a), master M issues synchronization request packet 86 at $M_0=2$. Slave S receives packet 86 at time $S_0=12$, and issues response packet 88 indicating time $S_0=12$. Master M receives this packet, and increments its time $M_1=12$. It then starts a new transaction with packet 90, indicating a new time $M_0'=12$. Slave S receives this at time $S_0'=12$, and confirms this in response packet 92. Master M receives the response at time $M_1'=12$ which confirms that the synchronization transaction has been completed.

In FIG. 5(b), the procedure is the same as that described for FIG. 5(a) with respect to a first transaction 94,96, but before the second transaction synchronization request packet 98 is received by slave S, the slave clock has self-incremented so that the packet 98 is received at time $S_0'=13$. This is indicated in response packet 100, and thus the master M must initiate a further transaction 102,104 in order to successfully complete the synchronization operation.

The timing diagrams of FIGS. 3, 4 and 5 are exemplary only, and do not embrace all variations of the synchronization scheme herein described.

Synchronization requests are initiated at predetermined routine intervals, the interval allowing for the degree of synchronal accuracy of the two clocks to be synchronized. A further check may be made to establish whether the synchronization transactions are causing clock changes too frequently, suggesting a system fault.

It will be recognized that the present invention may be adapted to operate for the protocol where master and slave clocks may only be decreased in value. This corresponds to the situation where data packets must be allowed to exist for a predetermined period of time, at the expense of ageing out some packets slightly tardily.

It will be recognized that the present invention applies to any system in which two processors require synchronization, and is not restricted to the embodiments herein described in respect of a routing system.

What is claimed is:

1. A method for performing a timer synchronization operation in a computer system, the computer system including a first processor having a first timer coupled to a second processor having a second timer, comprising the steps of:

the first processor issuing to the second processor a first timer value corresponding to a current value of the first timer;

the second processor comparing the first timer value with a second timer value corresponding to a current value of the second timer;

if the second timer value is greater than the first timer value, the second processor issuing to the first processor the second timer value and, responsive to receipt of the issued second timer value, the first processor adjusting the first timer value to be equal to the second timer value; and otherwise, performing the steps of:

if the second timer value is less than the first timer value, the second processor incrementing the second timer value to a new second timer value equal to the first timer value;

if the second timer value is equal to the first timer value, the second processor sending to the first processor an acknowledgment message indicating that the second timer value is equal to the first timer value; and the first processor completing the synchronization process.

2. A method for performing a timer synchronization operation according to claim 1, wherein the step of the first processor completing the synchronization process includes the steps of:

comparing the first timer value to the latest current value of the first timer;

if the first timer value is equal to the latest current value of the first timer, then terminating the synchronization operation; and otherwise, returning to the step of the first processor issuing to the second processor a first timer value.

* * * * *